(12) United States Patent
Wunsche, III et al.

(10) Patent No.: US 9,878,657 B2
(45) Date of Patent: Jan. 30, 2018

(54) PROJECTED LASER LINES/GRAPHICS ONTO THE ROAD FOR INDICATING TRUCK PLATOONING/WARNING TO OTHER DRIVERS OF PRESENCE OF TRUCK PLATOON

(71) Applicant: DENSO International America, Inc., Southfield, MI (US)

(72) Inventors: Robert William Wunsche, III, Clarkston, MI (US); Gareth Webb, Farmington, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 15/182,948

(22) Filed: Jun. 15, 2016

(65) Prior Publication Data

US 2017/0361762 A1    Dec. 21, 2017

(51) Int. Cl.
| | |
|---|---|
| *B60Q 1/28* | (2006.01) |
| *G08G 1/00* | (2006.01) |
| *B62D 15/02* | (2006.01) |
| *B60T 7/12* | (2006.01) |
| *F16H 59/60* | (2006.01) |

(52) U.S. Cl.
CPC .................. *B60Q 1/28* (2013.01); *B60T 7/12* (2013.01); *B62D 15/025* (2013.01); *F16H 59/60* (2013.01); *G08G 1/22* (2013.01)

(58) Field of Classification Search
CPC .. B60Q 1/28; B60T 7/12; F16H 59/60; G08G 1/22
See application file for complete search history.

(56) References Cited

U.S. PATENT DOCUMENTS

| | | | | |
|---|---|---|---|---|
| 6,128,559 A | * | 10/2000 | Saitou | ..................... B61L 23/34 340/436 |
| 6,133,851 A | | 10/2000 | Johnson | |
| 6,733,134 B2 | * | 5/2004 | Bleiner | ..................... B60Q 1/52 116/28 R |
| 6,866,232 B1 | * | 3/2005 | Finney | .................. B64G 1/242 244/172.4 |

(Continued)

FOREIGN PATENT DOCUMENTS

| | | |
|---|---|---|
| EP | 2985182 A2 | 2/2016 |
| JP | 2004-182121 A | 7/2004 |

(Continued)

OTHER PUBLICATIONS

U.S. Appl. No. 15/183,008, filed Jun. 15, 2016, Denso International America, Inc.
U.S. Appl. No. 15/183,060, filed Jun. 15, 2016, Denso International America, Inc.

*Primary Examiner* — Anne M Antonucci
(74) *Attorney, Agent, or Firm* — Harness, Dickey & Pierce, P.L.C.

(57) ABSTRACT

A system and method are provided and include a light source projector with a positional actuator mounted on a subject vehicle that projects a laser line on a roadway upon which the subject vehicle is traveling. A controller is in communication with a platoon vehicle traveling in front of or behind the subject vehicle in a platoon and controls the positional actuator to project the laser line on the roadway between the subject vehicle and the at least one platoon vehicle.

18 Claims, 2 Drawing Sheets

(56) References Cited

U.S. PATENT DOCUMENTS

| | | | | |
|---|---|---|---|---|
| 6,967,593 | B2 * | 11/2005 | Carroll | G08G 1/0965 |
| | | | | 250/334 |
| 7,175,321 | B1 * | 2/2007 | Lopez | B60Q 1/50 |
| | | | | 296/21 |
| 9,551,867 | B1 * | 1/2017 | Grabowski | G01C 21/365 |
| 2005/0117364 | A1 | 6/2005 | Rennick et al. | |
| 2006/0225329 | A1 * | 10/2006 | Morrow | G09F 7/04 |
| | | | | 40/591 |
| 2007/0053195 | A1 * | 3/2007 | Alberti | B60Q 1/2665 |
| | | | | 362/494 |
| 2009/0323046 | A1 * | 12/2009 | Tan | E01H 1/00 |
| | | | | 356/4.01 |
| 2010/0017111 | A1 | 1/2010 | Stefani | |
| 2010/0256852 | A1 * | 10/2010 | Mudalige | G08G 1/163 |
| | | | | 701/24 |
| 2012/0025962 | A1 | 2/2012 | Toll | |
| 2013/0335212 | A1 | 12/2013 | Purks et al. | |
| 2015/0203023 | A1 | 7/2015 | Marti et al. | |
| 2016/0019782 | A1 * | 1/2016 | Alam | G05D 1/0287 |
| | | | | 340/905 |
| 2016/0026187 | A1 * | 1/2016 | Alam | B60W 30/16 |
| | | | | 701/23 |
| 2016/0357187 | A1 * | 12/2016 | Ansari | G05D 1/0088 |

FOREIGN PATENT DOCUMENTS

| | | | | |
|---|---|---|---|---|
| JP | 2015-137097 A | | 7/2015 | |
| JP | 2015137097 A | * | 7/2015 | B60Q 1/00 |

* cited by examiner

PROJECTED LASER LINES/GRAPHICS ONTO THE ROAD FOR INDICATING TRUCK PLATOONING/WARNING TO OTHER DRIVERS OF PRESENCE OF TRUCK PLATOON

FIELD

The present disclosure relates to systems and methods that project laser lines and graphics onto a road surface for indicating truck platooning and for warning other drivers of the presence of a truck platoon.

BACKGROUND

This section provides background information related to the present disclosure, which is not necessarily prior art.

Vehicle platooning systems allow for multiple vehicles to communicate information and coordinate operation of vehicle systems as the vehicles travel on a roadway in a caravan or platoon. For example, truck platooning systems can communicate location, speed, and/or trajectory information, along with information regarding operation of the steering, braking, throttle, and transmission systems across all trucks in the caravan or platoon. Further, the truck platooning systems can coordinate operation of the steering, braking, throttle, and transmissions systems across all trucks in the caravan or platoon, in either a fully or partially autonomous manner, so that the trucks can safely travel in a tight line formation with reduced spacing between individual trucks in the caravan or platoon. As such, truck platooning systems can beneficially allow for trucks to travel in an aerodynamic fashion on the roadway, resulting in reduced fuel consumption. In a fully autonomous operating mode, operation of the truck's vehicle systems, including steering, braking, throttle, and transmission systems, can be automated and fully controlled by, or based on information from, the truck platooning system. In a partially autonomous operating mode, operation of some of the truck's vehicle systems can be partially automated and partially controlled by, or based on information from, the truck platooning system. In the partially autonomous mode, for example, the truck platooning system can assist a driver of the truck by providing information or partial control or guidance of the vehicle systems. For example, the truck platooning system can assist with adaptive cruise control by adjusting a speed of the truck based on the speed of other trucks in the caravan or platoon. For further example, the truck platooning system can actuate a braking system of the truck based on actuation of the braking system of other trucks in the caravan or platoon.

Although truck platooning systems exist, drivers of vehicles outside of the caravan or platoon can be unaware that the trucks in the caravan or platoon are linked, communicating, and being fully or partially controlled by a truck platooning system.

SUMMARY

This section provides a general summary of the disclosure, and is not a comprehensive disclosure of its full scope or all of its features.

The present teachings include systems and methods for projecting laser lines and graphics onto a roadway. A light source projector with a positional actuator is mounted on a subject vehicle that projects a laser line on a roadway upon which the subject vehicle is traveling. A controller is in communication with a platoon vehicle traveling in front of or behind the subject vehicle in a platoon and controls the positional actuator to project the laser line on the roadway between the subject vehicle and the at least one platoon vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
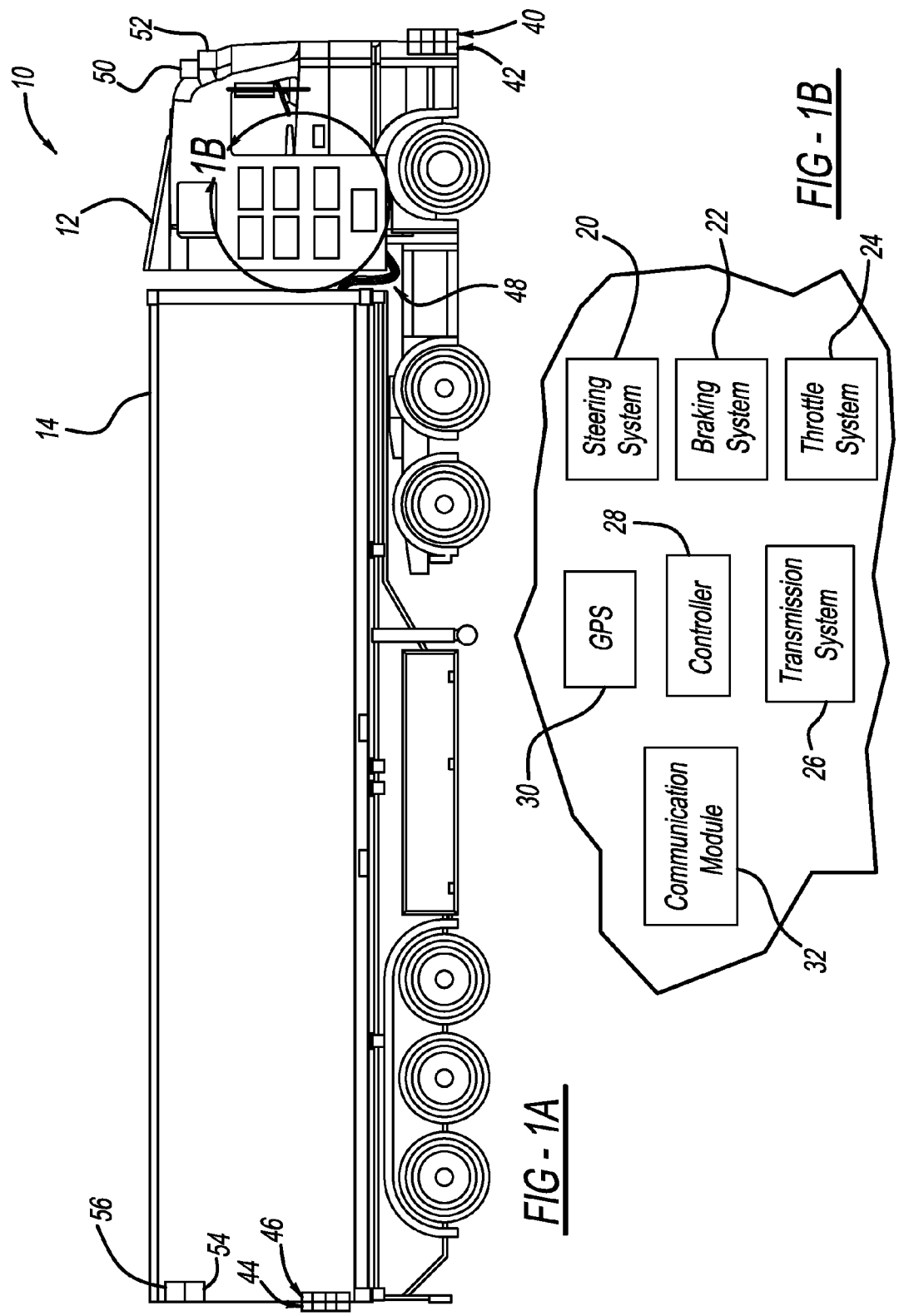
FIG. 1A illustrates a subject vehicle with a laser line and graphics projection system.
FIG. 1B illustrates a portion of the subject vehicle of FIG. 1A, including a controller of the subject vehicle.

With reference to FIG. 1A, a vehicle 10 including a laser line and graphics projection system is illustrated. Although the vehicle 10 is illustrated as a semi-trailer truck in FIG. 1A, the present teachings apply to any other suitable vehicle, such as an automobile, passenger car, sport utility vehicle (SUV), a mass transit vehicle (such as a bus), or a military vehicle, as examples. In the example of FIG. 1A, the vehicle 10 includes a tractor unit 12 and a semi-trailer 14 that is coupled to and towed by the tractor unit 12.

With reference to FIG. 1B, the vehicle 10 includes a steering system 20, a braking system 22, a throttle system 24, and a transmission system 26. The vehicle 10 also includes a controller 28 that controls the laser line and graphics projection system, as discussed in further detail below. The controller 28 can also fully or partially control the steering system 20, the braking system 22, the throttle system 24, and the transmission system 26 based on input from a driver of the vehicle and/or based on communication with other vehicles traveling in a truck platoon or caravan along with the vehicle 10. In this application, including the definitions below, the terms "controller," "module," and "system" may refer to, be part of, or include circuits or circuitry that may include processor hardware (shared, dedicated, or group) that executes code and memory hardware (shared, dedicated, or group) that stores code executed by the processor hardware. The code is configured to provide the features of the controller, modules, and systems described herein. In addition, in this application the terms "module" or "controller" may be replaced with the term "circuit."

The vehicle 10 can also include a global positioning system (GPS) 30 that detects or determines a current location of the vehicle 10. The vehicle can also include image sensors 50, 56 such as cameras, and environmental sensors 52, 54 such as Lidar sensors, radar sensors, ultrasonic sensors, or other sensors mounted on the front of the tractor unit 12 (e.g., 50, 52) and mounted on the back of the semi-trailer (e.g., 54, 56). The image sensors 50, 56 and the environmental sensors 52, 54 detect information about the surroundings of the vehicle 10, including, for example, other vehicles in front of and/or behind the vehicle 10, lane lines, guard rails, objects in the roadway, building, pedestrians, etc. Data from the image sensors 50, 56 and the environmental sensors 52, 54 can be communicated to and received by the controller 28. For example, data from the image sensor 56 and the environmental sensor 54 mounted to the back of the semi-trailer 14 can be communicated to the controller 28 through an electrical communication bus 48 between the tractor unit 12 and the semi-trailer 14.

As shown in FIG. 1B, the vehicle 10 also includes a communication module 32 for communicating with other vehicles, including, for example, one or more vehicles traveling in front of the vehicle 10 and one or more vehicles traveling behind the vehicle 10. For example, the communication module 32 can include a vehicle-to-vehicle communication module that performs short distance wireless communication in a frequency band of 5.9 GHz with a bandwidth of 75 MHz. Other suitable wireless communication systems, however, can be used for vehicle-to-vehicle communication. For example, the communication module 32 may have a communication range of 1,000 meters, although longer or shorter communication ranges can be used. In this way, vehicles traveling in a caravan or platoon may communicate with each other. Further, information may be passed from vehicle to vehicle up and down the caravan or platoon such that a vehicle at one end of the caravan or platoon can communicate with another vehicle at the other end of the caravan or platoon by passing information from vehicle to vehicle, even though the two vehicles are outside of the direct communication range and cannot communicate directly with each other.

The communication modules 32 for each vehicle in a truck platoon or caravan can communicate various information about the corresponding vehicle, including, for example: vehicle location, based on the GPS 30 or based on information from the image sensors 50, 56 and environmental sensors 52, 54; vehicle speed; vehicle trajectory; steering system information; braking system information; throttle system information; transmission system information; and/or information about the surroundings of the vehicle 10 based on information from the image sensors 50, 56, and/or information from the environmental sensors 52, 54, including, for example, other vehicles in front of and/or behind the vehicle 10, lane lines, guard rails, objects in the roadway, building, pedestrians, etc. In addition, the controller 28 can use the information received from other vehicles in the truck platoon or caravan to control the various vehicles systems of the corresponding vehicle, including, for example, the steering system 20, braking system 22, throttle system 24, and transmission system 26.

With reference again to FIG. 1A, the vehicle 10 includes a bank of light source projectors 40 on a front portion of the vehicle 10, such as a front portion of the tractor unit 12, with each light source projector 40 having a corresponding positional actuator 42. In the example of FIG. 1A, the light source projectors 40 are positioned on a lower front portion of the tractor unit 12. Additionally or alternatively, the light source projectors 40 can be positioned at other locations on the tractor unit 12. The vehicle 10 also includes a bank of light source projectors 44 on a rear portion of the vehicle, such as a rear portion of the semi-trailer 14, with each light source projector 44 having a corresponding positional actuator 42. In the example of FIG. 1A, the light source projectors 44 are positioned on a lower back portion of the semi-trailer 14. Additionally or alternatively, the light source projectors 40 can be positioned at other locations on the semi-trailer 14. The light source projectors 40, 44 can include a suitable light source, such as a laser diode emitting a laser beam of visible light. Additionally or alternatively, the light source projectors 40, 44 can include other light emitting diodes (LEDs), or other light sources, suitable and configured to produce a suitable beam of light that can be focused and directionally projected.

The positional actuators 42, 46 can adjust a directional position of the light source projectors 40, 44 to project laser lines and graphics onto a roadway in front of and/or behind the vehicle 10. For example, the bank of light source projectors 40 on the front of the tractor unit 12 can be positioned and controlled by the controller 28 to project laser lines and graphics onto an area of the roadway in front of the tractor unit 12. Additionally, the bank of light source projectors 44 on the back of the semi-trailer 14 can be positioned and controlled by the controller 28 to project laser lines and graphics onto an area of the roadway behind the semi-trailer 14. For example, one or more of the light sources in the bank of light source projectors 40, 44 can be rapidly positioned by the corresponding positional actuator to rapidly trace an outline of a laser line and/or graphic on the roadway of the vehicle. In this way, the controller 28 can control the positional actuators 42, 46 such that the light source projectors 40, 44 project laser lines and graphics onto the roadway in front of and/or behind the vehicle 10. The term laser lines, as used in the context of the laser lines projected by the light source projectors 40, 44 onto the roadway, refer to a clearly defined and distinct line of light projected onto the roadway (shown, for example, as laser lines 60 and 62 in FIG. 2).

Figure 2:
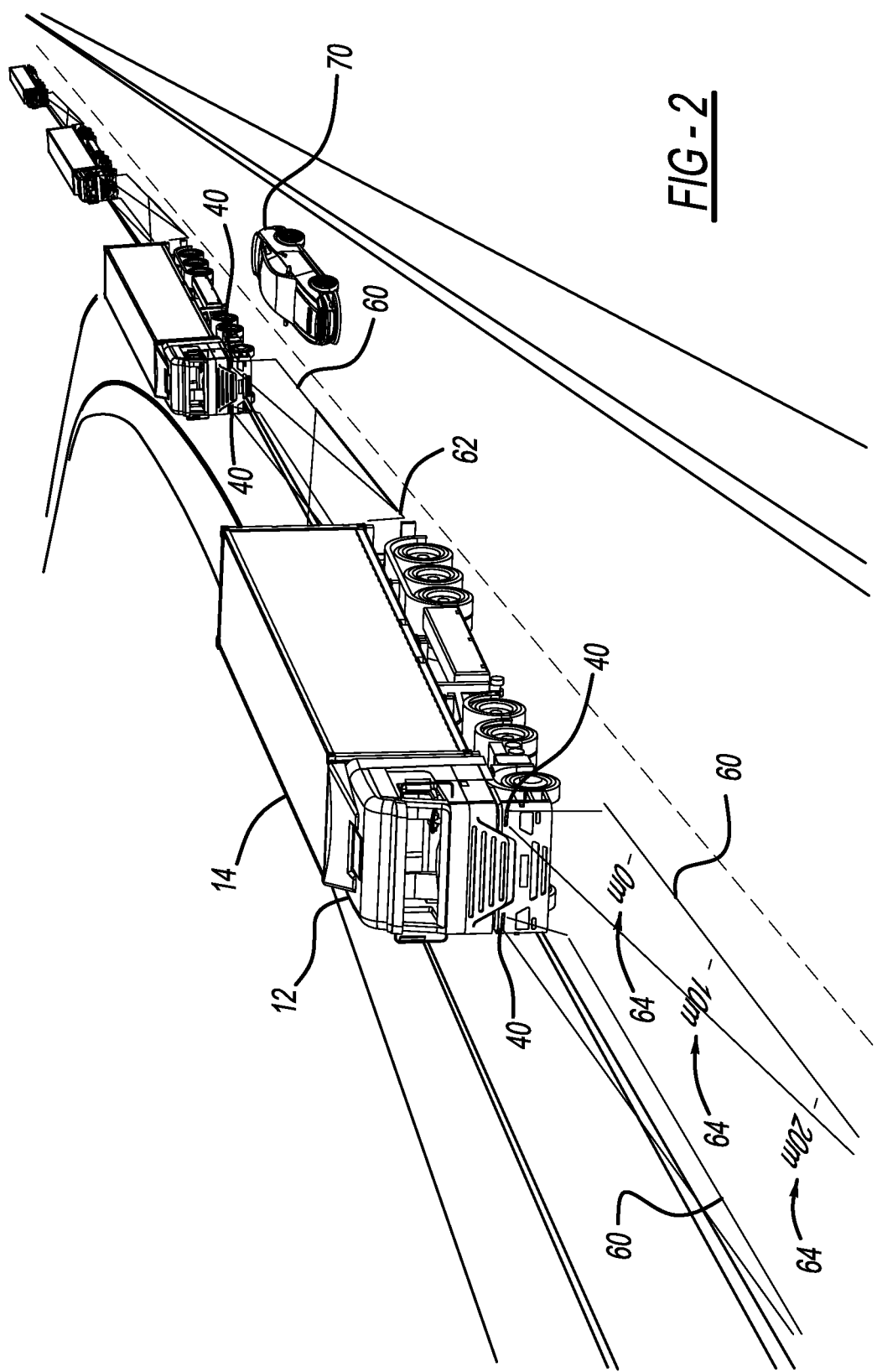
FIG. 2 illustrates the subject vehicle traveling in a truck platoon with the laser line and graphics projection system projecting laser lines and graphics on the roadway.

With reference to FIG. 2, a truck platoon is shown with four truck vehicles, each including a tractor unit 12 and a semi-trailer 14. As shown in FIG. 2, the light source projectors 40 on the front of the tractor unit 12 can project laser lines 60 in front of the vehicle, i.e., in front of the tractor unit 12. In addition, as shown for the lead truck in the truck platoon, the light source projectors 40 can also project graphics indicating distance markers 64 in front of the tractor unit 12. For example, as shown in FIG. 2, distance markers 64 can be provided at 0 meters, 10 meters, and 20 meters in front of the tractor unit 12 of the lead truck in the truck platoon, although other distances or distance indicators can be used.

As shown in FIG. 2, the light source projectors 40 on the tractor units 12 of the trailing or non-lead trucks in the truck platoon can project laser lines 60 on the roadway directed toward the back of the semi-trailer 14 of the next truck ahead in the truck platoon. In addition, the light source projectors 44 on the back of the semi-trailers 14 of the lead truck and each of the trailing trucks except for the last truck in the truck platoon can project laser lines 62 on the roadway toward the front of the tractor unit 12 of the next truck behind in the truck platoon. The controllers 28 of each of the vehicles in the truck platoon can coordinate operation of the positional actuators 42, 46 such that the forward projecting laser lines 60 overlap with the backward projecting laser lines 62 on the roadway to provide bright and clearly defined projected laser lines (comprised of overlapping laser lines 60, 62) indicating links between trucks in the truck platoon. Further, as the truck platoon travels through a curved section of roadway, the controllers 28 of each of the vehicles in the truck platoon can appropriately coordinate operation to project curved laser lines on the roadway between the vehicles in the truck platoon corresponding to the curve in the roadway.

In this way, the laser line and graphics projection systems (including the controllers 28, light source projectors 40, 44, and positional actuators 42, 46) of the vehicles 10 in the truck platoon can provide a clear visual indication via the projected laser lines 60, 62 on the roadway between the trucks in the truck platoon. The projected laser lines 60, 62 on the roadway can alert drivers of other vehicles in the roadway (e.g., vehicle 70) that the vehicles 10 in the truck platoon are linked, communicating, and traveling in an established truck platoon or caravan. In this way, the driver of the other vehicle 70 will know not to interrupt the truck platoon by changing lanes into the travel lane of the truck platoon and positioning the other vehicle 70 in between trucks traveling in the truck platoon.

Additionally, in the event another vehicle in the roadway (e.g., vehicle 70) approaches the space between trucks in the truck platoon, the light source projectors 40, 44 can change the color of the projected laser lines 60, 62 and/or flash or blink the projected laser lines 60, 62 on the roadway. For example, the projected laser lines 60, 62 can change from a first color (such as green or yellow) to a second colors (such as red). In this way, the different colored projected laser lines 60, 62 and/or the flashing or blinking projected laser lines 60, 62 can provide further warning, alert, and notification to the driver of the other vehicle 70 of the existence of the truck platoon and can deter the driver of the other vehicle 70 from positioning the other vehicle 70 in between trucks in the truck platoon and interrupting the truck platoon.

By alerting other drivers on the roadway to the existence of the truck platoon, the laser line and graphics projection systems of the present disclosure can beneficially deter other drivers from interrupting the truck platoon and causing a disruption in communication between trucks in the truck platoon. In addition, the laser line and graphics projection systems of the present disclosure can avoid a disruption in the beneficial aerodynamics and airflow around the truck platoon that may be caused by other drivers inadvertently interrupting the truck platoon by changing lanes into the travel lane of the truck platoon and by positioning other vehicles (e.g., vehicle 70) in between trucks in the truck platoon. In addition, laser line and graphics projection systems of the present disclosure can beneficially provide distance markers projected onto the roadway in front of one or more trucks in the truck platoon, indicating to the driver of the vehicle 10, or the drivers of other vehicles (e.g., vehicle 70), as to the distance in front of the vehicle. Additionally or alternatively, the laser line and graphics projection systems can change a color and/or blink or flash the distance markers and/or projected laser lines 60 when it is safe to change lanes into the travel lane in front of the lead truck in the truck platoon. For example, the projected laser lines 60 and/or the distance markers 64 can change to a first color (such as red) when it is not safe for a vehicle in an adjacent lane to change lanes into the lane in front of the lead truck and can then change to a second color (such as green) when it is safe for the vehicle to change lanes into the lane in front of the lead truck.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used is for the purpose of describing particular example embodiments only and is not intended to be limiting. The singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). The term "and/or" includes any and all combinations of one or more of the associated listed items.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
   at least one first light source projector with at least one first positional actuator mounted on a subject vehicle that projects a first laser line on a roadway upon which the subject vehicle is traveling; and
   a first controller in communication with a second controller of a platoon vehicle traveling in front of or behind the subject vehicle in a platoon, the platoon vehicle having at least one second light source projector with at least one second positional actuator mounted on the platoon vehicle that projects a second laser line on the roadway upon which the platoon vehicle is traveling;
   wherein the first controller controls the at least one first positional actuator to project the first laser line on the roadway, parallel to a lane line of the roadway, between the subject vehicle and the platoon vehicle;
   wherein the second controller controls the at least one second positional actuator to project the second laser line on the roadway, parallel to the lane line of the roadway, between the subject vehicle and the platoon vehicle; and
   wherein the first controller and the second controller communicate with each other to coordinate operation of the at least one first positional actuator and the at least one second positional actuator to overlap the first laser line with the second laser line to form a continuous laser line between the subject vehicle and the platoon vehicle while the subject vehicle and the platoon vehicle are traveling on the roadway.

2. The system of claim 1, wherein the first controller controls at least one of a steering system, a braking system, a throttle system, and a transmission system based on information received through communication with the platoon vehicle.

3. The system of claim 1, wherein the subject vehicle includes a tractor unit and a semi-trailer.

4. The system of claim 3, wherein the at least one first light source projector and the at least one first positional actuator are mounted on the tractor unit, the system further comprising:
   at least one additional light source projector with at least one additional positional actuator, the at least one additional light source projector and the at least one additional positional actuator being mounted on the semi-trailer, the first controller controlling the at least one additional positional actuator to project an additional laser line on the roadway behind the subject vehicle.

5. The system of claim 1, wherein the at least one first light source projector includes a first bank of light source projectors mounted on a driver side of the subject vehicle and a second bank of light source projectors mounted on a passenger side of the subject vehicle.

6. The system of claim 5, wherein the first bank of light source projectors are mounted on a front driver side of the subject vehicle and the second bank of light source projectors are mounted on a front passenger side of the subject vehicle, the system further comprising a third bank of light source projectors mounted on a rear driver side of the subject vehicle and a fourth bank of light source projectors mounted on a rear passenger side of the subject vehicle.

7. The system of claim 1, further comprising at least one additional light source projector with at least one additional positional actuator, wherein the first controller controls the at least one additional positional actuator to project a graphical display indicating at least one distance marker in front of the subject vehicle.

8. The system of claim 1, wherein the at least one first light source projector includes a laser diode.

9. The system of claim 1, further comprising at least one sensor that detects a secondary vehicle traveling on the roadway in a lane adjacent to the subject vehicle, wherein the first controller controls a color of the first laser line based on a position of the secondary vehicle relative to the subject vehicle.

10. A method comprising:
    projecting, with at least one first light source projector having at least one first positional actuator mounted on a subject vehicle, a first laser line on a roadway upon which the subject vehicle is traveling;
    controlling, with a first controller, the at least one first positional actuator to project the first laser line on the roadway, parallel to a lane line of the roadway, between the subject vehicle and a platoon vehicle traveling in front of or behind the subject vehicle in a platoon; and
    communicating, using the first controller, with a second controller of the platoon vehicle, the platoon vehicle having at least one second light source projector with at least one second positional actuator mounted on the platoon vehicle, the second controller controlling the at least one second positional actuator to project a second laser line on the roadway, parallel to the lane line of the roadway, between the subject vehicle and the platoon vehicle;
    wherein the first controller and the second controller communicate with each other to coordinate operation of the at least one first positional actuator and the at least one second positional actuator to overlap the first laser line with the second laser line to form a continuous laser line between the subject vehicle and the platoon vehicle while the subject vehicle and the platoon vehicle are traveling on the roadway.

11. The method of claim 10, further comprising:
    controlling, with the first controller, at least one of a steering system, a braking system, a throttle system, and a transmission system based on information received through communication with the platoon vehicle.

12. The method of claim 10, wherein the subject vehicle includes a tractor unit and a semi-trailer.

13. The method of claim 12, wherein the at least one first light source projector and the at least one first positional actuator are mounted on the tractor unit, the method further comprising:
    projecting, with at least one additional light source projector having at least one additional positional actuator mounted on the semi-trailer, at least one additional laser line; and
    controlling, with the controller, the at least one additional positional actuator to project the additional laser line on the roadway behind the subject vehicle.

14. The method system of claim 10, wherein the at least one first light source projector includes a first bank of light source projectors mounted on a driver side of the subject vehicle and a second bank of light source projectors mounted on a passenger side of the subject vehicle.

15. The method of claim 14, wherein the first bank of light source projectors are mounted on a front driver side of the subject vehicle and the second bank of light source projectors are mounted on a front passenger side of the subject vehicle, and wherein a third bank of light source projectors are mounted on a rear driver side of the subject vehicle and a fourth bank of light source projectors are mounted on a rear passenger side of the subject vehicle.

16. The method of claim 10, the subject vehicle having at least one additional light source projector with at least one additional positional actuator mounted on the subject vehicle, the method further comprising:
   controlling, with the first controller, the at least one additional positional actuator to project a graphical display indicating at least one distance marker in front of the subject vehicle.

17. The method of claim 10, wherein the at least one light first source projector includes a laser diode.

18. The method of claim 10, further comprising:
   detecting, with at least one sensor of the subject vehicle, a secondary vehicle traveling on the roadway in a lane adjacent to the subject vehicle; and
   controlling, with the first controller, a color of the first laser line based on a position of the secondary vehicle relative to the subject vehicle.

* * * * *

UNITED STATES PATENT AND TRADEMARK OFFICE
CERTIFICATE OF CORRECTION

PATENT NO. : 9,878,657 B2
APPLICATION NO. : 15/182948
DATED : January 30, 2018
INVENTOR(S) : Robert W. Wunsche, III et al.

Page 1 of 1

It is certified that error appears in the above-identified patent and that said Letters Patent is hereby corrected as shown below:

In the Claims

Column 8, Claim 14, Line 65, after "method", delete "system" -- therefor

Signed and Sealed this
Fifth Day of June, 2018

Andrei Iancu
*Director of the United States Patent and Trademark Office*